United States Patent
Mahy et al.

(10) Patent No.: US 7,580,150 B2
(45) Date of Patent: Aug. 25, 2009

(54) SYSTEM AND METHOD FOR REPRODUCING COLORS ON A PRINTING DEVICE

(75) Inventors: Marc Mahy, Wilsele (BE); Francis Verbeeck, Berchem (BE)

(73) Assignee: Agfa Graphics NV, Mortsel (BE)

( * ) Notice: Subject to any disclaimer, the term of this patent is extended or adjusted under 35 U.S.C. 154(b) by 678 days.

(21) Appl. No.: 10/520,452

(22) PCT Filed: Jul. 9, 2003

(86) PCT No.: PCT/EP03/50298

§ 371 (c)(1),
(2), (4) Date: Jul. 15, 2005

(87) PCT Pub. No.: WO2004/008737

PCT Pub. Date: Jan. 22, 2004

(65) Prior Publication Data

US 2006/0007252 A1    Jan. 12, 2006

Related U.S. Application Data

(60) Provisional application No. 60/406,450, filed on Aug. 28, 2002.

(30) Foreign Application Priority Data

Jul. 10, 2002  (EP) ................... 02102020

(51) Int. Cl.
*G06F 15/00* (2006.01)

(52) U.S. Cl. .................. 358/1.9; 358/523; 358/524; 347/3

(58) Field of Classification Search ............. 358/1.9, 358/3.06, 3.26, 518, 520, 515, 534, 523, 358/524; 347/13, 15; 345/591, 593, 600, 345/604

See application file for complete search history.

(56) References Cited

U.S. PATENT DOCUMENTS

| | | | |
|---|---|---|---|
| 5,087,981 A * | 2/1992 | Ng et al. | 358/3.05 |
| 5,296,947 A * | 3/1994 | Bowers | 358/527 |
| 5,526,140 A * | 6/1996 | Rozzi | 358/535 |
| 5,838,465 A * | 11/1998 | Satou et al. | 358/520 |
| 5,933,578 A | 8/1999 | Van de Capelle | |
| 6,072,589 A * | 6/2000 | Rozzi | 358/1.9 |
| 6,364,446 B1 * | 4/2002 | Ishikawa et al. | 347/15 |
| 6,480,299 B1 * | 11/2002 | Drakopoulos et al. | 358/1.9 |
| 6,742,869 B2 * | 6/2004 | Redding et al. | 347/43 |
| 7,352,488 B2 * | 4/2008 | Ben-Chorin et al. | 358/1.9 |
| 7,365,877 B2 * | 4/2008 | Meier et al. | 358/1.9 |
| 2002/0008880 A1 | 1/2002 | Dewitte et al. | |

(Continued)

FOREIGN PATENT DOCUMENTS

EP        1083739        3/2001

(Continued)

*Primary Examiner*—Kimberly A Williams
(74) *Attorney, Agent, or Firm*—Keating & Bennett, LLP

(57) ABSTRACT

A method and a system for outputting an image having a specific color on an output device, the method including (a) analyzing the image; (b) creating a model for the output device, based on the analysis, wherein the model encompasses the specific color and is made in a particular space having a one-to-one relation to a device independent color space.

3 Claims, 1 Drawing Sheet

U.S. PATENT DOCUMENTS

| | | | |
|---|---|---|---|
| 2002/0149546 A1* | 10/2002 | Ben-Chorin et al. | 345/32 |
| 2003/0128246 A1* | 7/2003 | Redding et al. | 347/13 |
| 2004/0081915 A1* | 4/2004 | Andrews | 430/293 |
| 2005/0083346 A1* | 4/2005 | Takahashi et al. | 345/600 |
| 2005/0280847 A1* | 12/2005 | Cairns et al. | 358/1.9 |
| 2006/0139668 A1* | 6/2006 | Nishikawa | 358/1.9 |
| 2006/0232804 A1* | 10/2006 | Furukawa | 358/1.9 |
| 2006/0279791 A1* | 12/2006 | Shoji | 358/3.26 |

FOREIGN PATENT DOCUMENTS

| | | |
|---|---|---|
| EP | 1146726 | 10/2001 |
| WO | WO 00/74372 | 12/2000 |

\* cited by examiner

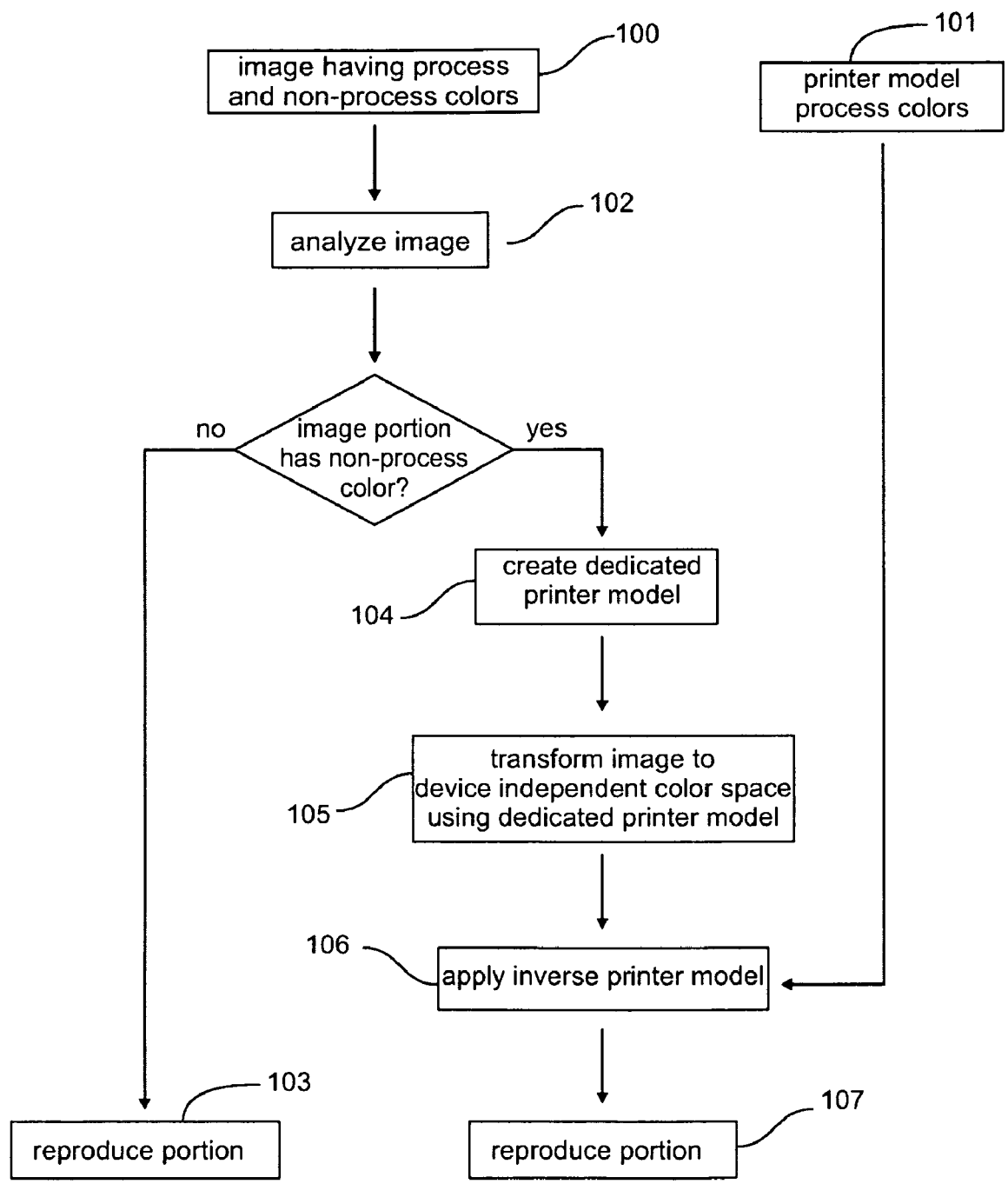

SYSTEM AND METHOD FOR REPRODUCING COLORS ON A PRINTING DEVICE

This application is a national stage filing under 35 USC §371 of PCT application No. PCT/EP2003/050298 filed Jul. 9, 2003 which claims priority to EP application no. 02102020.1 filed Jul. 10, 2002 and U.S. provisional patent application No. 60/406,450 filed Aug 28, 2002.

FIELD OF THE INVENTION

The present invention relates to methods and apparatuses for the reproduction of color documents; the invention especially concerns color management. The invention is particularly suitable for the reproduction of objects defined by a mixture of process inks and non-process inks.

BACKGROUND OF THE INVENTION

Today, more and more output systems are developed for the reproduction of color images. Several display and printing technologies are used such as CRT's, LCD's, conventional photography, electrophotography, thermal transfer, dye sublimation and ink jet systems to name a few. In the rest of this document, these systems will be referred to as output devices.

All these systems can be described as multi-dimensional color devices with n colorants such as CMYK (cyan, magenta, yellow and black) inks of an ink jet system or RGB (Red, Green, Blue) in case of a display system. In this document it is assumed that the colorant values for printers range from 0% (no colorant laid down on paper) to 100% (maximum amount of colorant laid down on paper). For display systems, the values range from 0 to 255. In the rest of this document, mainly a printer will be used as an example of an output system, however, it is well known in the art of color management systems that all aspects of printers can be easily extended to those of display systems.

With colorant space is meant an n-dimensional space, wherein n is the number of independent variables with which the output device can be addressed. For an offset printing press e.g., the dimension of the colorant space equals the number of inks of the printing press. If CMYK inks are used, the dimension of the colorant space is four. Colorant spaces are also referred to as device dependent spaces.

The colorant gamut is defined by all possible combinations of colorant values, ranging from 0% to 100% for printers and from 0 to 255 for display systems, taking into account a number of specified colorant limitations. If there are no colorant limitations, the colorant gamut is an n-dimensional cube.

With calorimetric space is meant a space that represents a number of quantities of an object that characterize its color. In most practical situations, colors will be represented in a 3-dimensional space such as the CIE XYZ space. However, also other characteristics can be used such as multi-spectral values based on filters that are not necessarily based on a linear transformation of the color matching functions. The values represented in a calorimetric space are referred to as calorimetric values. Colorimetric spaces are also referred to as device independent spaces or as color spaces.

A printer model is a mathematical relation that expresses calorimetric values in function of colorants for a given output system. The variables for the colorants are denoted as $c_1$, $c_2, \ldots, c_n$ with n the dimension of the colorant space. An n-ink process is completely characterized by its colorant gamut with a number of colorant limitations and the printer model.

Because of this close relationship between an n-ink process and the printer model, the operations typically defined for a printer model are easily extended to an n-ink process.

The printer model is often based on a printer target. Such a target consists of a number of uniform color patches, defined in the colorant space of the printing device. In a next step the printer target is printed and measured, and based on the values of the patches in colorant space and the measured colorimetric values, the printer model is made. A printer target is normally characterized by a number of sampling points along the different colorant axes. Based on the sampling points a regular grid can be constructed in colorant space of which a number of grid points are contained by the printer target. Hence a target can be said to be complete or incomplete. We refer to patent application EP-A-1 146 726, herein incorporated by reference in its entirety for background information only, for more information on grids, complete and incomplete printer targets, and related terms.

With inverting an n-ink process is meant that the corresponding printer model is inverted. The transformation of an n-ink process to colorimetric space on the other hand is equivalent to the transformation of the corresponding colorant gamut to color space by making use of the printer model.

We refer to patent application EP-A-1 083 739, herein incorporated by reference in its entirety for background information only, for more information on colorant spaces, color spaces, and other relevant terms.

Based on a printer model, forward and inverse look up tables are constructed. These tables are also referred to as tables or color tables. A forward table transforms colorant values to calorimetric values whereas the inverse tables transforms calorimetric values to colorant values. Inverse tables are also called separation tables or color separation tables.

The present invention is related to the rendering of page descriptions, consisting of multiple page elements such as text, different types of images and color gradations (color gradations, also called color vignettes, are elements wherein color smoothly changes from one color to another one).

In most cases, the page elements are described in a calorimetric or colorant space, which may either be a device independent color space such as CIELAB, or a device dependent space such as RGB or CMYK. If the page has to be reproduced on a given output system, such as a printer or a display system, the color values have to be transformed to the proper colorant values of the concerned output system. This transformation is required as the color space of the page elements is in most cases different from the color space of the output system. In fact for most documents it is not known in advance on which output system the document will be reproduced and the different page elements may be defined in different color spaces. Hence to reproduce these page elements, each element is preferably color managed by making use of proper color transformations.

In a lot of cases, all page elements are defined in the same conventional color space. Depending on the application, this is usually a device dependent RGB, CMY or CMYK space. In home office environments, the RGB space corresponds to a monitor space and preferably the sRGB space is used. In a graphic arts environment, the CMYK values are typically standard Euro, SWOP or standard newspaper colorant values.

If the output system is known on which the document has to be reproduced, the color values have to be transformed unless the color space of the page elements corresponds to the color space of the output device. Such a transformation is in most cases done with color tables. A worldwide-accepted system to transform the colors is given by the ICC, the International Color Consortium. With this approach, each device is characterized to or from a device dependent color space. Such a transformation is described by tables, matrices and TRC's (Tone Reproduction Curves, i.e. one-dimensional look up tables) which are stored in a profile. In most cases profiles contain both forward and inverse color tables. Hence, if all page elements have the same color space, profiles can be used to perform the proper color management operations.

If on the other hand different page elements are defined by different but conventional color spaces, and these spaces can be described properly by conventional profiles, then the ICC approach can also be applied easily. To support this functionality, different applications allow the embedding of profiles in images.

For a number of page elements, however, ICC profiles do not yield good results. This is the case when non-process colors or a combination of process and non-process colors are used. Process colors are the colorants used in conventional printing processes such as CMYK for normal offset printing, or cyan, magenta, yellow, black, orange and green in case of Hexachrome™ printing. In addition to process colors, non-process colors may be used, such as custom colors and spot colors. A custom color is a colorant especially created for a particular application. Spot colors on the other hand are colorants that are typically used if images are created artificially. The designer of the image then chooses one or more spot colors to render some image portions more accurately. In practice, a spot color is chosen out of a set containing tenths or hundreds of colorants. Spot colors are also called named colors.

Since a spot color is chosen out of a very large set of colorants, it is not practical to make color tables to describe the mixing of one or several spot colors.

As only the calorimetric values of the 100% patch are known, a spot color is usually rendered by transforming the calorimetric values of the 100% patch to the colorant values of the output device. By making use of simple interpolation techniques, colorant values for in between dot percentages of the spot color can be obtained.

More complicated is the situation in which multiple spot colors, or spot colors and process colors are printed on top of each other. Due to the very large number of possible color combinations, it is practically impossible to print the most elementary combinations in order to be able to construct an accurate printer model.

Therefore, if spot colors are printed on top of each other, it is customary to calculate the overlap simply by adding the colorant values of the individual spot colors. Take for example an overlap of 40% of a first spot color and 70% of a second spot color, and suppose that the colorant space of the output device is CMYK. The CMYK colorant values of the 40% patch are determined from values of the 100% patch of the first spot color, and those of the 70% patch are determined from the 100% patch of the second spot color. The color of the overlap is then predicted by adding the CMYK values of the 40% and those of the 70% patch. However, this solution is not accurate.

There is thus a need for an improved method.

SUMMARY OF THE INVENTION

The present invention is a method for outputting an image having a specific color on an output device, the method including the steps of: analyzing the image for an overlap of the specific color with another color; creating a model for the output device, based on the analysis, wherein the model encompasses the specific color, uses spectral information of the specific color and is created in a particular space having a one-to-one relation to a device independent color space. Preferably a method in accordance with the invention is implemented by code run on a computer.

An embodiment of the present invention is explained by reference to the drawing. A dedicated printer model is created 104 describing the color mixing of a non-process color with a given number of non-process colors and/or process colors. To build the model 104, the colorant combinations of the image need to be known. In a preferred embodiment of the invention, the image 100 is therefore analyzed 102, and the model is created, based on the analysis. One or more image characteristics may be extracted from the image and used in creating the model.

As mentioned above, customarily a printer model 101 is created before the image is processed. Usually the printer model is based on a printer target that is printed by means of the process colors, which are often CMYK. The printer model is then used in reproducing portions 103 of images that are composed of process colors. As mentioned above, for image portions wherein non-process colors are used, a second, very simple approach is used wherein the non-process colors are converted to CMYK and, in case of overlapping non-process colors, the CMYK values of these non-process colors are added.

In a method in accordance with the invention, the second model is preferably created 104 in another space than CMYK space. Advantageously, the model is created in a device independent space, such as CIELAB or, which is preferred, CIE XYZ. A space that has a one-to-one relation to a device independent space, such as sRGB, may also be used. Moreover, it is preferred to use another model than the simple addition of colorant values, in case of overlapping colors spot colors. In one embodiment of the invention, the spectral Neugebauer equations are used, as is discussed further below. Such a model in accordance with the invention is completely different from the customary simple addition in CMYK space. Preferably, to create the model, information is used on what non-process colors are present in the image. More preferably, also information is used on the occurrence of overlaps of non-process colors with each other and with process colors. Such information is included in the data of the image that is to be output, and can be extracted from the image by analyzing the image data.

The dedicated printer model is used to transform 105 the portions of the image that include non-process colors. On these transformed portions, the inverse printer model 106 is applied for transforming these portions into the process colors so that they can be reproduced 107 on the printer.

An advantage of the invention is that spot colors, and especially the overlap of spot colors with each other or with other colors, are reproduced with higher color quality.

Another advantage is better reproduction of the transition between process colors and non-process colors.

A preferred application is proofing an image on a proofing device, also called proofer, before it will be printed on another output device such as an offset press. The proofer is preferably an ink jet printer.

BRIEF DESCRIPTION OF THE DRAWINGS

The Drawing is a flowchart of a process of a preferred embodiment of the present invention.

Further advantages and embodiments of the present invention will become apparent from the following description.

DETAILED DESCRIPTION OF THE INVENTION

If in a page description an object is defined by a non-process ink, a technique is required to reproduce the object in a way that is in agreement with the expectations of the customer. In the graphic arts, such a non-process ink is called a spot color; such an ink is used in the design of an image to create special color effects.

If the images designed for an offset system need to be simulated on a proofer or reproduced on another output system, profiles can be used to transfer the offset color values to a device independent color space whereas the profile corresponding to the output system will transfer these color values further on to the colorant values of the output system. This method is used for the process colors (which are usually CMYK). As mentioned before, no color tables are available for spot colors and hence, the color values corresponding to colorant values of spot colors have to be predicted in another way.

In graphic arts, a phenomenon that influences the reproduction of colors is dot gain. To reproduce an image by means of offset printing, color separations are made for the printing plates. If only process colors are used, typically separations corresponding to the cyan, magenta, yellow and black ink are generated, resulting in four printing plates. However, if also additional spot colors are to be printed, for every spot color an additional separation has to be made, resulting in an additional printing plate. Each printing plate is used to print one of the inks on a receiving substrate, such as paper. In printing, the dot size on paper appears to be larger than the dot sizes sent to the printing system. This effect is known as dot gain, and it is considered as a typical characteristic for the printing environment characterized for example by the ink, paper and press combination. Therefore, if a spot color has to be simulated, also for this spot color some dot gain has to be taken into account to predict the exact color. Hence, a technique is required that is able to predict the dot gain as if the colors were printed in offset. To predict dot gain accurately, a number of parameters have to be taken into account such as the types of ink and paper used. In practice dot gain can be predicted satisfactorily by specifying a standard dot gain curve. This curve represents the dot gain or dot loss as a function of the colorant values sent to the printing system.

A preferred embodiment of the invention is the following. An advantage of this embodiment is that it allows accurate reproduction of specific colors, such as spot colors and custom colors. Moreover, the overlap of such a specific color with another color, that may be a spot color, a custom color or a process color, may be output with high color quality.

A model for the color mixing between spot colors or between spot colors and process colors is created based on an analysis of the image data, which include the spot color information. The model may be made the first time it is needed and applied "on the fly" pixel per pixel; or the model may be made in advance before the image is processed and applied "on the fly" pixel per pixel; or the model may be made in advance, evaluated for a number of colorant combinations to obtain a color transformation table, and the table is applied pixel per pixel by making use of interpolation techniques. The latter alternative is preferred, because it is computationally less intensive. In that case the complete image may be analyzed to check the color characteristics. The analysis detects the presence of non-process colors, as well as overlaps between non-process colors, and between process colors and non-process colors. The non-process colors (e.g. spot colors, custom colors) then receive a special treatment. A model encompassing these colors is made, as discussed below.

Spot Color Reproduction

The reproduction of a spot color can be considered as a model for a 1-ink process. As printer model, it is preferred to use the Neugebauer equations, which are regarded as the basic model to predict color reproduction, e.g. in offset printing. However, the Neugebauer model does not predict dot gain. To simulate the dot gain behavior of a printing process, the well-known Yule-Nielsen correction can be used. The disadvantage of this correction is that it is highly dependent on the measurement technique, specifically the filters used for the color measurements and the model that is applied. Therefore, it is preferred to apply an improved dot gain correction that in general can be described by a model that modifies the colorant value itself. This modified colorant value is then input to the Neugebauer model. Such an improved dot gain correction, i.e. improved with respect to the Yule-Nielsen correction, may be obtained by making use of measured values. These measurement values may originate from the measurement of a printer target such as the IT8.7/3, IT8.7/4 or the ECI2002 target. Such a target can contain either colorimetric data such as CIELAB and XYZ, densities or spectral information. For one of these data sets, curve fitting is applied to the measured values in ordinate, as a function of the colorant values in abscissa. In the simplest way, the data for the 1-ink processes are taken from the measurement file and in between values are obtained by interpolation, e.g. linear interpolation. From the obtained curve, the dot gain values for CMYK can be determined. This can be calculated as the difference in dot percentage between the linear process between the 0% and 100% values and the fitted process. For example the dot gain for the 50% value has the following characteristic: the measurement value of the 50% value is equal to the measurement value of the (50+dot gain) % value in the linear process. For spot colors, the same dot gain behavior as for the process colors can be presumed. The Neugebauer model is then applied to the dot gain corrected colorant values. Dot gain corrected values in our example can be obtained by the sum of the dot percentage and its dot gain.

For a 1-dimensional process, as is the case for the reproduction of a single spot color, the Neugebauer model corresponds to linear interpolation between the device independent color values of the paper and those of the 100% patch of the spot color. Preferably a tristimulus space such as CIE XYZ is used for this interpolation; more preferably it is also used for the measurement values.

In a next step, the thus obtained device independent color values, e.g. in CIE XYZ, are transformed to the device dependent colorant values of the output system. If the output system is then addressed with these device dependent colorant values, a reproduction of the image on the output system is made. The output system may be a proofing device, in which case a proof of the image is obtained. The transformation to the device dependent colorant values of the output system is a so-called inverse transformation. If, for this inverse transformation, color tables are used, as within the ICC framework, sometimes the colors are desaturated and a rendering intent may have to be used that is not necessarily optimal for the rendering of spot colors. Therefore, another method is sometimes preferred.

Analogously to the creation of the model for the output device discussed above, the inversion may be created on the fly or in advance a dedicated inversion table may be calculated. If processing speed is required, the latter is preferred. If however, the transform has to be quite accurate, on the fly inversions are preferred in order to avoid interpolation errors. To obtain a combination of both, a dedicated table with a small step can be built in advance, in order to allow accurate calculation of the transformation. If the colorant values for the output device are represented by 8 bit data, for the most accurate approach separations for all 256 colorant values are calculated in advance to be used to transform the spot color values in the device independent space to the colorant space of the output system.

Reproduction of Two Spot Colors

In the case of two overlapping spot colors, only the calorimetric values for the two individual 100% patches are given (such 100% patches are also referred to as the solids). In this case too, a model is required to predict the calorimetric values of all possible combinations of overlap. However, in general not enough information is available to use a printer model. Let us take the Neugebauer model for a 2-ink process as an example. This model is given as follows:

$$X = X_p(1-c_1)(1-c_2)k_0 + X_1 c_1(1-c_2) + X_2(1-c_1)c_2 + X_{12} c_1 c_2$$

$$Y = Y_p(1-c_1)(1-c_2)k_0 + Y_1 c_1(1-c_2) + Y_2(1-c_1)c_2 + Y_{12} c_1 c_2$$

$$Z = Z_p(1-c_1)(1-c_2)k_0 + Z_1 c_1(1-c_2) + Z_2(1-c_1)c_2 + Z_{12} c_1 c_2$$

with ($X_p$, $Y_p$, $Z_p$) the XYZ values of the paper ($X_1$, $Y_1$, $Z_1$) the XYZ values of the solid of the first spot color ($X_2$, $Y_2$, $Z_2$) the XYZ values of the solid of the second spot color ($X_{12}$, $Y_{12}$, $Z_{12}$) the XYZ values of the overlap of both spot colors $c_1$ and $c_2$ the colorant value of the first and second spot color (X, Y, Z) the XYZ values of the resulting color.

As can be seen from this formula, also the overlap of the two spot colors is needed.

This issue may be solved by using the transmission spectra of the solids and the reflectance curve of the paper to predict the calorimetric values of the 200% ink overlap. The simplest model that can be used are the spectral Neugebauer equations. For even more accurate color predictions, corrections can be taken into account concerning several physical effects of light interactions at the ink surface, in the ink layers, between the ink layers and in the paper. Descriptions of these physical effects and corrections therefore can be taken from the specialist literature.

Besides this spectral modeling, it is preferred also to incorporate dot gain effect. As discussed above, this effect may be modeled explicitly, e.g. by means of curves based on experimental data. Alternatively, dot gain values may be input by the user.

Similarly to the case of reproduction of a single spot color, the obtained colorimetric values (e.g. in CIE XYZ) are separated into the device dependent colorant values of the output device.

Reproduction of Process Colors and a Spot Color

Also in the case of mixing process colors and a spot color, a model is required that predicts the colors of all possible overlaps. This model is preferably continuous with respect to the model that is used in the forward color separation tables for the process colors only. As these tables are regular grids, the forward regular grid, for the four process colors CMYK, can easily be extended with the spot color to obtain a 5-dimensional ink process. All the combinations of process inks in the forward table are maintained, and the solid spot color value is given. However, to be able to use interpolation schemes within color tables, at least all the corner points of the 5-dimensional colorant cube have to be specified. Hence, all combinations of 0% and 100% for the process colors and the 100% of the spot color have to be provided. To predict these combinations, a printer model is needed. Also in this case, a simple spectral Neugebauer process with additional dot gain modulation can be used. For even better prediction, more complex approaches modeling different physical processes may be used. If a more accurate table is required, additional combinations of spot color values in between 0% and 100% with colorant values of the process colors can be determined with the printer model, and filled out in the table. To keep the 5-dimensional forward table as small as possible, preferably only existing sampling points of the process colors are taken, with a minimum number of extra values for the spot color.

In this way a non-regular grid is obtained from which an irregular localized model can be constructed; for more details we refer to EP-A-1 146 726, mentioned already above. Hence, a method is provided to build a forward model that is a trade-off between taking into account a minimum of extra patches and hence a model that is as small as possible, and a more accurate model by filling out more colorant combinations resulting in a larger forward table.

For the inverse transformation from the calorimetric space to the colorant space of the output system, again, as discussed above, color tables may be used as within the ICC framework, or the inversion may be calculated on the fly, or a dedicated inverse separation table may be created once, i.e. in advance.

If only a limited number of combinations (i.e. overlaps) of the spot color and the process colors are present in the image, e.g. the spot color is only printed with cyan and magenta but not with yellow and black, then a smaller forward table can be constructed. In this way less colorant combinations have to be taken into account and a good continuity is achieved between process colors on the one hand and the combination of process colors and spot colors on the other hand.

If the image does not contain color gradations that are a combination of a spot color and the process colors, then the number of combinations of the spot color and process colors is quite limited. In that case, only for that limited number of combinations of process colors with the spot color, the resulting color has to be predicted, and the corresponding colorant values of the output system may again be calculated in advance or on the fly.

Reproduction of Process Colors and Several Spot Colors

The previous approach to predict the calorimetric values for the overlap between one spot color and process colors can easily be extended to several spot colors.

It is known in the art to create a model for an output device, and to invert such a model, beforehand, i.e. before data on the image are available, which data include what colors and what overlapping colors occur in the image.

From the embodiments discussed above, it is clear that, in the present invention, a model may be created only when needed. Also the inversion on the fly may be used as needed. As computers get faster and faster, this option becomes more and more interesting.

In one embodiment of the invention, the image is to be output directly on an output device. The output device may e.g. be an ink jet printer, or a printing device that uses printing plates, such as an offset press. The non-process colors may then be converted to the process colors of the corresponding output device; combinations of only process colors do not need to be transformed.

In another embodiment of the invention, the image is to be output on an output device such as an offset printing press, but first the image is to be simulated on a proofing device. In this case, first the printer model of the offset press is applied to the image, and then the inverse model of the proofer.

As mentioned already above, the model that is created preferably uses data on the image; these image data may be determined by analyzing the image, or data concerning the image may be input by the user. Take for example an image that contains a particular spot color yellow, and suppose that the color data, e.g. XYZ data, of this yellow result in a dirty yellow being printed. The user can then override the color data for this yellow.

In a particular embodiment of the invention, the data of the image that is to be output are sent to the RIP, which stands for raster image processor. Usually, the image data that are input to the RIP (e.g. in PostScript™ format) are already separated in data in process colors, usually CMYK, on the one hand and in separate data, per spot color used, on the other hand.

The following example illustrates a set of operations that may then be performed in the RIP. First, a dot gain correction is applied. Then, a model for the output device is created and applied to the spot colors. The spot color(s) are thus transformed to XYZ space. A rendering intent, that is specifically adapted to the spot colors, transforms the spot colors to another XYZ space, say X'Y'Z'. Supposing that the image is to be proofed on a proofing device, a gamut mapping for the proofer is applied, followed by the inverse proofer model, which results in colorant values for the proofer. Possibly a smoothing step is applied.

In another embodiment of the invention, one or more of the preceding operations are omitted.

For combinations, i.e. overlaps, of spot colors with other spot colors or with process colors, it is preferred to use an accurate model as set out above. However, especially if overlaps between three or even more colors occur, e.g. an overlap of a spot color with two process colors, a simplified "adding model" may also be used. For the color combinations that occur most, preferably an accurate model is applied. For the less occurring color combinations, the spot colors may be converted to process color space, which is usually CMYK, by means of interpolation between the colorimetric values of the receiving substrate and those of the 100% patch of the concerned spot color. The resulting CMYK values of the overlapping spot colors and process colors are then added. In case a colorant value of more than 100% is obtained, the colorant values are rescaled or, which is preferred, clipped.

The invention is not limited to embodiments described above. What was discussed especially for spot colors, also holds for other non-process colors, such as custom colors. The process colors may be CMYK, they may be Hexachrome™ colors, they may be six colors including CMYK and two colors selected from the group of orange, blue and green. Instead of a spectral Neugebauer model, another model may be used, such as polynomial fitting.

The invention includes a system and a method as disclosed above and as claimed in the appending claims. The invention also includes a printing plate and a printing plate precursor made by a method in accordance with the invention. A "printing plate precursor" is an imaging material that can be used as a printing plate after one or more treatment steps, that include image-wise exposure and possibly processing: The invention further includes a color proof obtained by a method in accordance with the invention.

Having described in detail preferred embodiments of the current invention, it will now be apparent to those skilled in the art that numerous modifications can be made therein without departing from the scope of the invention as defined in the appending claims.

The invention claimed is:

1. A method for reproducing an image including process colors in a first colorant space and a non-process color on a first printer having a first printer model, the first printer model being arranged to transform the first colorant space into a device independent color space, and the first printer model having an inverse first printer model arranged to transform the device independent color space into the first colorant space, the method comprising the steps of:

analyzing the image to detect first portions in the image having only process colors and second portions having non-process colors;

reproducing the first portions of the image in the first colorant space on the first printer; and reproducing the second portions of the image on the first printer by:

creating a dedicated printer model that encompasses the non-process color and that has a one-to-one relation to the device independent color space;

using the dedicated printer model to transform the second portions into the device independent color space;

using the inverse first printer model to transform the second portions from the device independent color space to the first colorant space; and reproducing the second portions in the first colorant space on the first printer.

2. The method according to claim 1, wherein the first printer uses printing plates to reproduce the image.

3. The method according to claim 2, further comprising the steps of:

using the first printer model to transform the first portions from the first colorant space to the device independent color space;

using an inverse second printer model to convert the first and second portions from the device independent color space to a second colorant space of a second printer; and reproducing the first and second portions in the second colorant space on the second printer.

* * * * *